UNITED STATES PATENT OFFICE.

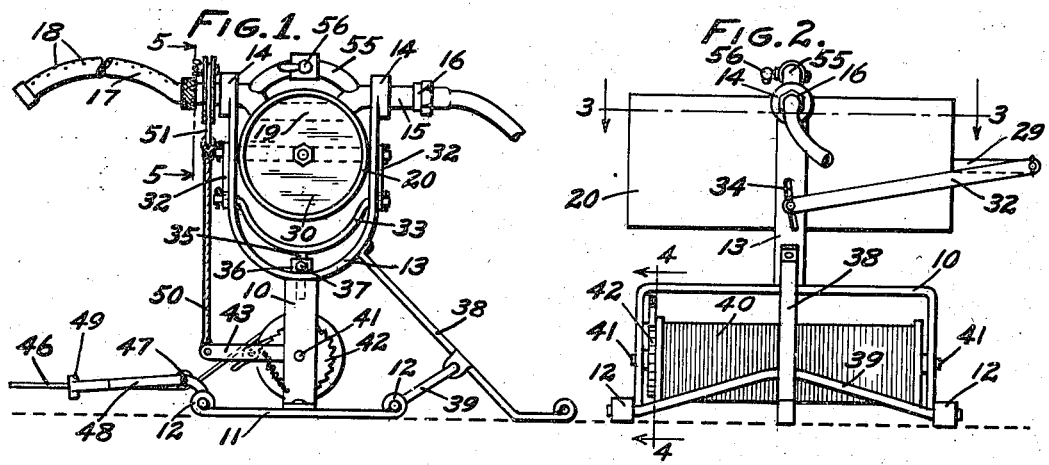

NATHAN H. GOODBAR, OF LOS ANGELES, CALIFORNIA.

LAWN SPRINKLER.

1,419,843.  Specification of Letters Patent.  Patented June 13, 1922.

Application filed February 21, 1921. Serial No. 446,791.

*To all whom it may concern:*

Be it known that I, NATHAN H. GOODBAR, a citizen of the United States, residing at Los Angeles, in the county of Los Angeles and State of California, have invented new and useful Improvements in Lawn Sprinklers, of which the following is a specification.

My invention relates generally to sprinkling apparatus, and more particularly to a mobile device that is particularly applicable for sprinkling lawns and the like.

The principal objects of my invention are to generally improve upon and simplify the existing types of lawn sprinklers, to provide a relatively simple and efficient form of apparatus having a rocking or oscillating sprinkler head, to provide automatically operating means controlled by the combined pressure and weight of the water passing through the apparatus for imparting oscillating or rocking movement to the sprinkler head, to provide simple and efficient means wherein the sprinkler head is caused to rock or oscillate through arcs of predetermined length, to provide means for controlling the speed of oscillation of the sprinkler head, and further, to provide means whereby the motion of the rocking or sprinkling head is utilized for moving the apparatus and thereby causing it to travel from one point to another on the ground or lawn that is being sprinkled.

A further object of my invention is to provide a mobile lawn sprinkling device that is of relatively simple structure, capable of being easily and cheaply manufactured and which operates with great efficiency and with a minimum expenditure of energy.

With the foregoing and other objects in view, my invention consists in certain novel features of construction and arrangement of parts that will be hereinafter more fully described and claimed and illustrated in the accompanying drawings, in which:

Fig. 1 is an end elevational view of a lawn sprinkling apparatus of my improved construction.

Fig. 2 is a side elevational view of the sprinkler.

Fig. 3 is an enlarged horizontal section taken approximately on the line 3—3 of Fig. 2.

Fig. 4 is an enlarged detail section taken approximately on the line 4—4 of Fig. 2.

Fig. 5 is an enlarged detail section taken approximately on the line 5—5 of Fig. 1.

Fig. 6 is an elevational view of the part illustrated in Fig. 5.

Fig. 7 is a diagrammatic view that graphically illustrates the rocking or oscillatory movements of parts of my improved lawn sprinkler.

Referring by numerals to the accompanying drawings, which illustrate a practical embodiment of the invention, 10 designates an inverted U-shaped frame member, to the lower ends of the vertical legs of which are secured transversely disposed plates 11 which perform the functions of skids or runners to support the sprinkler while the same is being drawn over the surface of the ground, and the ends of these plates are bent upwardly to form loops 12.

Secured to the central portion of the horizontal member of frame 10, is the lower portion of an upright U-shaped member 13, the upper ends thereof terminating in horizontally aligned bearings 14 that are fitted with rollers or like anti-friction members.

Journaled in the bearings 14 is a horizontally disposed tube 15 one end of which carries a coupling 16 whereby a water supply pipe such as a hose may be connected to said tube, and the opposite end of said tube 15 carrying an elongated upwardly curved sprinkler head 17 the upper portion of which is perforated, as designated by 18, to form jet openings.

The central portion of the tube 15, or that portion between the bearings 14, is depressed with respect to its end portions and said depressed portion, which is designated by the numeral 19, extends transversely through the upper portion of an open ended cylinder 20. Arranged in the center of this cylinder and below the portion 19 of tube 15 is a partition $20^a$, which, together with the depressed portion 19 of tube 15, divides the space in cylinder 20 into two equal sized chambers.

Formed through the portion 19 of tube 15 and within the cylinder 20, are aligned openings 21, and arranged for sliding movement therethrough is a slotted tubular member 22 that is provided on its ends with plates 23 and said plates having secured thereto the inner ends of outwardly projecting compression springs 24. The length of the slotted cylindrical member 22 is substantially greater than the width of the tubular member 19 and the discs 23 carried by the ends of said slotted member are adapted to alternately close the openings 21 in said tube.

Formed through the portion 19 of tube 15 is a pair of aligned apertures 25, and arranged to slide therethrough is a slotted tubular member 26, the same carrying at its center a disc 27 that is adapted to alternately close the openings 25.

Secured to the ends of slotted cylindrical member 26 are the inner ends of outwardly projecting compression springs 28.

Arranged in the center of depressed portion 19 of the tube 15 and between the slotted cylindrical valve members 22 and 26, is a partition 19ᵃ.

Extending through cylinder 20 is an axially disposed piston rod 29, and carried thereby and arranged within the cylinder, on opposite sides of the portion 19 of tube 15 and the valves arranged in said portion 19, are pistons 30 the packed edges of which fit snugly against the inner surface of the cylinder.

One end of piston rod 29 carries a cross bar 31 and pivotally connected to the ends thereof are the outer ends of links 32. The inner ends of these links are pivotally connected to the end portions of a substantially U-shaped member 33 that is positioned within and above the lower portion of the U-shaped member 13, and the end portions of said member 33 project through slots 34 that are formed in the upright portions of U-shaped member 13. Member 33 is vertically adjustable relative to member 13, and to permit of such vertical adjustment and to lock the member 33 in its vertically adjusted position, a rod or pin 35 depends from the central portion of said member 33 and extends downwardly through a collar 36 that is positioned on member 13 and said collar being provided with a set screw 37, which latter, when tightened, locks pin 35 to said collar 36.

Secured to U-shaped member 13 is a rearwardly and downwardly extending arm 38 the lower end portion of which is adapted to bear upon the ground, and connecting the intermediate portion of this arm 38 with the adjacent loops 12 on base members 11, are suitable braces such as 39. A drum 40 is provided on its ends with trunnions 41 that are journaled at the upright members of the inverted U-shaped frame member 10, and secured to one end of this drum is a ratchet wheel such as 42. Fulcrumed on the trunnion 41 adjacent to this ratchet wheel, is one end of a vibrating arm or lever 43 and arranged thereupon is a spring held pawl 44 the point of which is adapted to engage the teeth of ratchet wheel 42. A spring held detent 45 is arranged on the adjacent upright member of frame 10 and which detent is adapted to engage the teeth of ratchet wheel 42 and retain the same against reverse rotary motion.

Secured to drum 40 is one end of a flexible member 46 such as a wire or wire cable and the latter passes beneath a bearing roller 47 that is journaled on a swinging frame 48, the latter being pivotally connected to the loops 12 opposite the loops to which braces 39 are connected and the outer end of said swinging frame carries a loop or eye 49 through which the wire or wire cable 46 passes.

Secured to the outer end of vibrating arm 43 is the lower end of a vertically disposed flexible member 50, preferably a short section of wire cable, and the upper end of said flexible member is secured to a ring or loop 51 that encircles the corresponding portion of tube 15. The upper portion of ring or loop 51 is journaled on a pin 52 that passes through the upper portion of a bracket 53, the latter being fixed in any suitable manner to the adjacent portion of tube 15. The upper portion of this bracket is preferably provided with three or more apertures 54 in order that the pin 52 upon which the loop 51 is mounted may be vertically adjusted and thereby vary and regulate the length of the swinging movement imparted to arm 43. Connecting the portions of tube 15 immediately adjacent to the ends of depressed portion 19, is a by-pass pipe 55 in which is located a valve 56.

In the operation of my improved lawn sprinkler, the apparatus is positioned at one side of a lawn or at one side of the space that is to be sprinkled and the wire or cable 46 is unwound from the drum 40, and the end of said wire or cable is secured to a stationary object, such as a post, on the opposite side of the lawn or space to be sprinkled. A hose or similar flexible tube is connected to member 16 and when the water is turned on through said hose, it will pass through the corresponding portions of tube 15 and depressed portion 19 thereof and discharge through the opening 25 that is open.

Assuming that the parts of the apparatus occupy the positions as illustrated in Fig. 3, the water will pass through the right hand one of the openings 25 and fill the space between the centrally arranged partition within cylinder 20 and the adjacent or right hand piston 30, and when this space is filled with water the pressure of the incoming water will gradually move this right hand piston outwardly through the cylinder 20 and correspondingly drawing the other or left hand piston inwardly or toward the center. This inward movement of the left hand piston 30 will cause the volume of water in front of it to be discharged through the open one of the openings 21 and said water will pass through the adjacent portion of tube 15 and through sprinkler head 17 and said water being discharged in jet form through openings 18 in said sprinkler head.

As these movements continue and the right hand piston continues to travel away from the central partition in cylinder 20, the weight of the gradually increasing volume of water behind said piston, together with the pressure thereof, will cause the corresponding end of the cylinder to move downward, and which movement is gradual, owing to the link connections 32 between the end of piston rod 29 and the ends of member 33.

During the first part of the movement of the right hand piston 30 away from the center of the cylinder, the adjacent springs 24 and 28, which were compressed on the previous inward movement of said right hand piston, will expand to their normal conditions, but by reason of the frictional engagement between the slotted cylinders 22 and 26 and the walls of the portion 19 of tube 15, said members 22 and 26 will retain their positions to permit the inlet of water in one end of the cylinder and the discharge of water from the other end, until the valve members 22 and 26 have been shifted through the tubular member 19 to reverse the inlet and discharge of the water and which action is accomplished during the final inward movement of the left hand one of the pistons 30. During the latter part of the inward movement of the left hand piston, the outer ends of the corresponding springs 24 and 28 will be engaged, and as the inward movement continues, these springs will be partially compressed and finally the valve members 22 and 26 will be forced through the openings 21 and 25 in member 19. With the parts so positioned the water entering the cylinder will discharge into the space between the central partition therein and the left hand piston 30, thereby causing the latter to move outwardly in said cylinder, and upon the corresponding inward movement of the right hand piston the water in front of the latter will pass outwardly through the corresponding opening 21 and from thence to and through sprinkler head 17.

Obviously, as the volume of water increases behind the left hand piston 30 the weight of said water, together with its pressure, will slowly lower the corresponding end of the cylinder, and as a result of this continued oscillation of the cylinder, the tube 15 and sprinkler head 17 will be correspondingly rocked and the jets of water from said sprinkler head will be distributed over a relatively wide area. As tube 15 is thus rocked, the arm of bracket 53 will be correspondingly rocked, thereby moving pin 52 through the arc of a circle concentric with the axis of tube 15, and following this movement ring or yoke 51 will be correspondingly moved, and consequently, a slight vertical movement will be imparted to flexible member 50 and which movement will vibrate arm 43. On the forward movement of this arm the point of pawl 44 will engage the teeth of ratchet wheel 42, thereby rotating the same the distance of one tooth, and this movement correspondingly rotates drum 40 and slowly winds the wire or cable 46 thereupon, and as a result the sprinkling apparatus is slowly drawn across the lawn or surface of the ground to the point where the wire or cable is anchored.

The distance or degree of oscillation of the cylinder can be regulated by vertical adjustment of member 33 to which the links 32 are connected and the speed of oscillatory movement can be accurately controlled by means of the valve 56 in by-pass pipe 55, for by partially opening this valve, a certain amount of water is permitted to flow directly from one end of tube 15 to the other end and as a result the oscillatory movement of the cylinder will be relatively slow.

A sprinkling apparatus of my improved construction is comparatively simple, can be easily and cheaply produced, is entirely automatic in action and is very effective in performing its intended functions.

It will be readily understood that minor changes in the size, form and construction of the various parts of my improved lawn sprinkler may be made and substituted for those herein shown and described without departing from the spirit of my invention, the scope of which is set forth in the appended claims.

I claim as my invention:

1. In a lawn sprinkler, an oscillating cylinder provided with a partition, a portion of which is hollow, valves arranged for movement through the hollow portion of the partition, a sprinkler head connected to the hollow portion of the partition, a piston rod arranged to move through said partition, and pistons on said rod on opposite sides of said partition.

2. In a lawn sprinkler, a cylinder mounted for rocking movement which cylinder is provided with a partition a portion of which is hollow, valves arranged for operation through the hollow portion of the partition, pistons arranged for operation within the cylinder on opposite sides of the partition which pistons are adapted to shift the valves from one position to another, a sprinkler head connected to the hollow portion of the partition, and means for delivering water to the hollow portion of the partition.

3. In a lawn sprinkler, a cylinder mounted for rocking movement which cylinder is provided with a partition a portion of which is hollow, valves arranged for operation through the hollow portion of the partition, pistons arranged for operation within the cylinder on opposite sides of the partition which pistons are adapted to shift the valves from one position to another, a sprinkler head connected to the hollow portion of the partition, means for delivering water to the hollow portion of the partition, and means connected to said pistons and actuated by the movement thereof for imparting rocking movement to the cylinder.

4. In a lawn sprinkler, a cylinder mounted for rocking movement which cylinder is provided with a partition a portion of which is hollow, valves arranged for operation through the hollow portion of the partition, pistons arranged for operation within the cylinder on opposite sides of the partition which pistons are adapted to shift the valves from one position to another, a sprinkler head connected to the hollow portion of the partition, means for delivering water to the hollow portion of the partition, means connected to said pistons and actuated by the movement thereof for imparting rocking movement to the cylinder and a portion of which last mentioned means is adjustable in order to vary the degree of rocking movement imparted to said cylinder.

5. In a lawn sprinkler, a cylinder mounted for rocking movement which cylinder is provided with a partition a portion of which is hollow, valves arranged for operation through the hollow portion of the partition, pistons arranged for operation within the cylinder on opposite sides of the partition which pistons are adapted to shift the valves from one position to another, a sprinkler head connected to the hollow portion of the partition, means for delivering water to the hollow portion of the partition, means connected to said pistons and actuated by the movement thereof for imparting rocking movement to the cylinder, and adjustable means for regulating the speed of rocking movement imparted to said cylinder.

6. In a lawn sprinkler, a cylinder mounted for rocking movement which cylinder is provided with a partition a portion of which is hollow, valves arranged for operation through the hollow portion of the partition, pistons arranged for operation within the cylinder on opposite sides of the partition which pistons are adapted to shift the valves from one position to another, a sprinkler head connected to the hollow portion of the partition, means for delivering water to the hollow portion of the partition, means connected to said pistons and actuated by the movement thereof for imparting rocking movement to the cylinder, a portion of which last mentioned means is adjustable in order to vary the degree of rocking movement imparted to said cylinder, and adjustable means for regulating the speed of rocking movement imparted to said cylinder.

7. In a lawn sprinkler, a framework, a cylinder supported by said framework and mounted for rocking movement, means for delivering water to said cylinder, a pair of spaced pistons arranged for operation within the cylinder, water control valves actuated by said pistons for admitting water into the cylinder first against one piston and then against the other piston, a sprinkler head which receives water from said cylinder, means for utilizing the weight and pressure of the water delivered to the cylinder for rocking the same, means for regulating the degree of rocking movement imparted to said cylinder and means for controlling the speed of said rocking movement.

8. In a lawn sprinkler, a framework, a cylinder supported by said framework and mounted for rocking movement, means for delivering water to said cylinder, a pair of spaced pistons arranged for operation within the cylinder, water control valves actuated by said pistons for admitting water into the cylinder first against one piston and then against the other piston, a sprinkler head which receives water from said cylinder, means for utilizing the weight and pressure of the water delivered to the cylinder for rocking the same, means for regulating the degree of rocking movement imparted to said cylinder, means for controlling the speed of said rocking movement, and automatically operating means associated with the framework and cylinder rocking means for effecting a movement of the framework and parts carried thereby over the surface of the ground.

9. In a lawn sprinkler, a cylinder mounted for rocking movement, a sprinkler head carried thereby, a supply pipe carried by the cylinder and leading to said sprinkler head, a by-pass pipe in said supply pipe a pair of spaced pistons arranged for reciprocating movement within the cylinder, valves located in the water supply pipe within said cylinder and adapted to be actuated by said pistons for admitting water into the cylinder face against one piston and then against the other piston.

10. In a lawn sprinkler, a cylinder mounted for rocking movement, a water supply pipe extending transversely through said cylinder, a partition associated with said supply pipe and dividing the space within the cylinder into two chambers, a piston arranged for operation in each chamber, a connection between said pistons, and valves arranged for sliding movement through the water supply pipe and adapted to be actuated by said pistons for admitting water first to one chamber within said cylinder and then to the other chamber.

11. In a lawn sprinkler, a framework, a rocking sprinkler head arranged for operation in said framework, means for utilizing the weight and pressure of the water for imparting movement to said sprinkler head, a drum journaled in the framework, a cable connected to and adapted to wind upon said drum, and means actuated by the rocking movement of the sprinkler head for rotating said drum.

12. In a lawn sprinkler, a framework, a rocking sprinkler head arranged for operation in said framework, means for utilizing the weight and pressure of the water for imparting movement to said sprinkler head, a drum journaled in the framework, a cable connected to and adapted to wind upon said drum, means actuated by the rocking movement of the sprinkler head for rotating said drum and a portion of which drum rotating means is adjustable in order to vary the speed of rotation imparted to said drum.

In testimony whereof I have signed my name to this specification.

NATHAN H. GOODBAR.